(12) United States Patent
Liu et al.

(10) Patent No.: US 9,373,965 B2
(45) Date of Patent: Jun. 21, 2016

(54) ELECTRIC POWER ROUTER WITH MULTIPLE POWER SUPPLY MODES

(71) Applicant: Tianjin University, Tianjin (CN)

(72) Inventors: Yingshu Liu, Tianjin (CN); Zhichao Li, Tianjin (CN); Xiaorui An, Tianjin (CN)

(73) Assignee: TIANJIN UNIVERSITY, Tianjian (CN)

( * ) Notice: Subject to any disclaimer, the term of this patent is extended or adjusted under 35 U.S.C. 154(b) by 0 days.

(21) Appl. No.: 14/646,014

(22) PCT Filed: Apr. 4, 2014

(86) PCT No.: PCT/CN2014/074843
§ 371 (c)(1),
(2) Date: May 19, 2015

(87) PCT Pub. No.: WO2014/176958
PCT Pub. Date: Nov. 6, 2014

(65) Prior Publication Data
US 2016/0049794 A1   Feb. 18, 2016

(30) Foreign Application Priority Data
Apr. 28, 2013   (CN) .......................... 2013 1 0156292

(51) Int. Cl.
*H02J 5/00*  (2016.01)
*H02J 3/38*  (2006.01)
*H02J 9/06*  (2006.01)

(52) U.S. Cl.
CPC ... *H02J 5/00* (2013.01); *H02J 3/38* (2013.01); *H02J 9/06* (2013.01)

(58) Field of Classification Search
CPC .................. H02J 3/38; H02J 5/00; H02J 9/06
See application file for complete search history.

(56) References Cited

U.S. PATENT DOCUMENTS

| 2012/0059532 | A1 | 3/2012 | Reifenhauser et al. | |
| 2012/0212052 | A1* | 8/2012 | Cyuzawa | H02J 5/00 307/26 |
| 2012/0286723 | A1* | 11/2012 | Ukita | G06Q 10/06312 320/107 |
| 2015/0357909 | A1* | 12/2015 | Kobayashi | H02M 7/493 363/126 |

FOREIGN PATENT DOCUMENTS

| CN | 102005817 A | 4/2011 |
| CN | 102420428 A | 4/2012 |

(Continued)

*Primary Examiner* — Jared Fureman
*Assistant Examiner* — Joel Barnett
(74) *Attorney, Agent, or Firm* — George G. Wang; Bei & Ocean

(57) ABSTRACT

The present invention belongs to the field of utilization of distributed power generations and smart power management and, relates to an electric power router with multiple power supply modes; it includes a control unit, a communication module, a bidirectional alternate/direct current converter, a switch array, a direct current power line, two alternate current power lines, a power line measuring module, and router ports; wherein, the router ports include a plurality of power source ports and load ports; the switch array includes a single throw switch for grid connection and a plurality of double throw switches, all of which are controlled by the control unit; the direct current power source ports of the router ports are connected to the direct current power line, the direct current power line is connected to the second alternate current power line through the bidirectional alternate/direct current converter; the alternate current power source ports and load ports are connected through two alternate current power lines and the switch array. The present invention enables highly effective and smart management to kinds of power sources and loads, according to the power supplying condition of the power sources as well as the power consumption characteristics and consumption demands of the loads.

2 Claims, 2 Drawing Sheets

(56) References Cited

FOREIGN PATENT DOCUMENTS

| CN | 102664415 A | 9/2012 |
|---|---|---|
| CN | 102780267 A | 11/2012 |
| CN | 102810909 A | 12/2012 |
| CN | 202817753 U | 3/2013 |
| CN | 103248068 A | 8/2013 |
| JP | 2008-67544 A | 3/2008 |

* cited by examiner

ELECTRIC POWER ROUTER WITH MULTIPLE POWER SUPPLY MODES

FIELD OF THE INVENTION

The present invention relates to utilization of distributed power generations and smart power management and, in particular, an electric power router with multiple power supply modes in the fields of smart grid and smart home.

BACKGROUND OF THE INVENTION

Distributed generations (DGs) possess extensive application perspective at the present situation where increasing attention are being focused on energy demand, due to their roles in energy saving, emission reduction and peak load shifting in electric power supply. However, for the existing distributed generations (especially those dispersedly located DGs with low power capacities), there is still a long way to go before they can be exploited sufficiently and properly. It is even less practical to meet the requirements of coordinated operation between huge numbers of DGs and the distribution network. This is mainly due to the limitation in the functionalities of the conventional facilities. The electric power system is in need of smart electrical connection devices which can meet the requirements of the IEEE 1547 and IEC 61850 protocols, especially in the case where low voltage electric connection devices for common residential users are in badly shortage. The term "electrical connection device" herein makes much more sense as the integration of effective monitoring and management of all kinds of electrical connections (including connections between the power sources and loads, connections between power facilities and a microgrid or the distribution network, as well as the connections among various microgrids) than the mere functionality of physical connections. However, power facilities of prior art are unable to guarantee comprehensive and effective monitoring and management of large numbers of DGs for onsite connection. Besides, most existing DGs and loads are not smart enough in their communication and control functionalities, and there is a lack of "information exchange" among them, thereby leading to insufficient utilization of distributed energy.

The diversity of distributed energy leads to the variety of their power generation technologies. Prior art is unable to guarantee "seamless connection" and "plug and play" for the DGs in microgrids and the distribution network. As a result, it is hard to enable global monitoring and control for the grid management system. Consequently, there is a need for developing a smart low voltage electrical connection device which facilitates effective integration and utilization of various DGs and is suitable for residential users, in order to meet the requirements on DG connection and smart power management in the fields of smart grid and smart home.

In an electrical connection device (referred to as electric power router) disclosed in Chinese Patent No.: CN201210261558.6 filed previously by the inventor, there is proposed a solution in which electrical circuit connection and switching are implemented through a switch array for effective utilization of the distributed energy and collaborated operations for the power sources and loads. In this solution, the switches in the switch array increase with the number of power sources and loads, which makes the hardware framework of the electric power router complicated and unsuitable for the "power routing" of large capacity.

SUMMARY OF THE INVENTION

The object of the present invention is to overcome the shortcomings of the prior art and provide an electrical connection device which is relatively simple in construction, suitable for power management of residential users, and can also serve as the electrical connection device between microgrids of commercial buildings or residential communities and the distribution network as well. The present invention is capable of effective integration and utilization of various distributed energies and is suitable for residential users for smart low voltage power connection to the microgrid or the distribution network. According to the instant information on the operating conditions of the power sources, the operating characteristics and power demand of the loads, high efficient and smart energy management can be realized with the present invention for the purpose of energy saving, emission reduction, and peak load shifting in electric power supply.

The present invention is implemented according to the following technical solution:

An electric power router with multiple power supply modes includes a control unit, a communication module, a bidirectional alternate current/direct current converter, a switch array, a direct current (hereinafter referred to as DC) power line, two alternate current (hereinafter referred to as AC) power lines, a power line measuring module, and router ports.

The router ports include a plurality of power source ports and load ports, each of which has a unique port number. The power source ports include DC ports and AC ports. The AC ports include a grid power dedicated port and general purpose ports for connections to AC power sources other than the grid.

The switch array wherein includes a single throw switch for grid connection and a plurality of double throw switches, all of which are controlled by the control unit.

The DC power source ports in the router ports are connected to the DC power line. The DC power line is connected to the second AC power line through the bidirectional AC/DC converter. The AC power source ports and load ports are connected through two AC power lines and the switch array. Specifically, the grid power dedicated port is connected with the first AC power line, while the general purpose AC power source ports can be connected with the first or second AC power line via the double throw switches of the switch array. The load ports can be connected with the first or second AC power line via the double throw switches of the switch array. The second AC power line can be connected with the first AC power line by the single throw switch of the switch array for grid connection. By shifting of the double throw switches of the switch array, each of the load ports can be connected with either of two AC power lines. By shifting of the double throw switches of the switch array, each of the general purpose AC power source ports can be connected with either of two AC power lines.

Each router port includes a current measurement unit, a voltage measurement unit and a power information processing unit. The current measurement unit is connected with the port in series, while the voltage measurement unit is connected with the same port in parallel. The outputs of the current measurement unit and voltage measurement unit are connected to the input of the power information processing unit, while the output of the power information processing unit is connected to the control unit.

The current measurement unit is used for measuring the current through the power source port or load port connected thereto, and the voltage measurement unit is used for measuring the voltage across the power source port or load port connected thereto. The measurements from the current measurement unit and the voltage measurement unit are sent to the power information processing unit. Based on the received measurements, the power information processing unit at the power source port calculates the power quality and power supply information of the power source connected thereto and the input power flow through the port per unit time, and then sends above information in real time to the control unit; based on the measurements from the voltage measurement unit and current measurement unit, the power information processing unit at the load port calculates the electrical characteristics and power consumption of the load connected thereto and the output power flow through the port per unit time, and then sends above information in real time to the control unit.

The AC power source ports may be of single phase or three phase in electricity for connections with single-phase or three-phase grid power and AC power sources other than the grid power. The load port may be of single phase or three phase in electricity for connections with single-phase or three-phase loads.

The power line measuring module is used for measuring instant information such as voltage and current of the DC power line, and voltage, current, frequency and phase of the second AC power line, and sending above information to the AC/DC converter and control unit in real time.

The control unit is connected respectively with the bidirectional AC/DC converter, switch array, router ports, power line measuring module, and communication module. The operation of the control unit includes: 1) communicating with the power sources and loads connected to the electric power router, other electric power routers, and the management system of the microgrid or the distribution network through the communication module; 2) based on the power supply information provided by each power source and the electrical characteristics and power demand provided by the loads, or based on the power supplying status of the power sources and the power consumption characteristics of the loads acquired by the measurement modules of the router ports, making match the power supplying capability of the power source with the electrical characteristics and power consumption demand of the load; 3) enabling connection between the second AC power line and first AC power line by controlling the operation of the single throw switch for grid connection of the switch array; 4) enabling connection between the load ports and either of the two AC power lines by controlling the operation of the double throw switches of the switch array; 5) enabling connection between the general purpose AC power source ports and either of two AC power lines by controlling the operation of the double throw switches of the switch array; 6) calculating the total amount of power supplied by the power source and total amount of power consumption of the load during the process of power supply from the power source to the load through the electric power router; and 7) controlling the operation of the bidirectional AC/DC converter according to the voltage and current of the DC power line and voltage, current, frequency and phase of the second AC power line measured by the power line measuring module.

As a preferred embodiment, the power sources except for the grid power connected to the electric power router with multiple power supply modes of the invention may have three operation modes: the grid tied operation, islanded operation, and parallel operation; 1) in case all the loads connected to the electric power router with multiple power supply modes are powered by the DC power line and second AC power line, and the power supply from the power sources except the grid power is still sufficient, the second AC power line may be connected with the first AC power line through the single throw switch for grid connection so that the electric power router is working in grid tied operation mode; 2) when grid power is cut off, all the loads are connected to the DC power line, or to the second AC power line via the double throw switches of the switch array, all the loads connected to the electric power router are powered by the power sources other than the grid power or the energy storage element connected with the power router, which is the islanded operation mode; 3) when the grid power is connected to the electric power router and single throw switch for grid connection is switched off, the second AC power line is disconnected with the first AC power line, but both AC power lines may supply power respectively to the loads via the double throw switches of the switch array, in this case, the energy storage element and the power sources other than the grid power, along with the gird power itself, supply power to different loads simultaneously through the electric power router, which is the parallel operation mode. During above process, operations including connection, disconnection and shifting of any one of the switches of the switch array are controlled by the control unit.

The electric power router with multiple power supply modes of the present invention facilitates smart power management for common residential users. Its merits include: 1) enabling comprehensive and appropriate exploitation of distributed energy as well as peak load shifting in electric power supply; and 2) enabling alternate and direct current power supply modes, and is suitable for integration of different kinds of distributed energy and energy storage devices.

DETAILED DESCRIPTION OF THE INVENTION

The working principle of the present invention is discussed below with reference to the drawings.

The present invention provides an electric power router with multiple power supply modes capable of realizing optimized and matched operation between the DGs and loads, as well as grid connection management of the DGs.

Figure 1:
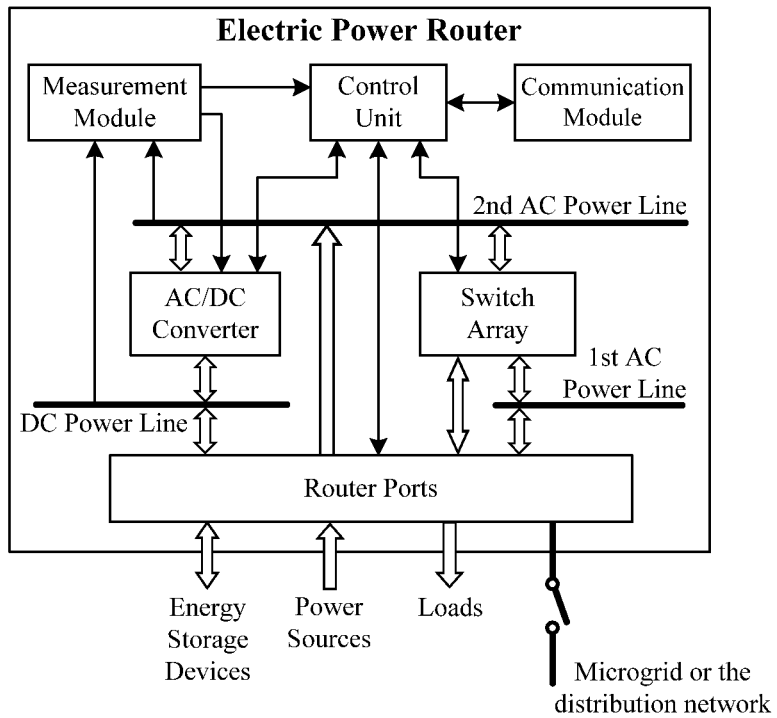
FIG. 1 shows hardware schematic of the electric power router with multiple power supply modes.

Referring to FIG. 1, an electric power router with multiple power supply modes presented by the invention includes a control unit, a communication module, a bidirectional AC/DC converter, a switch array, a DC power line, two AC power lines, a power line measuring module, and router ports. The router ports include a plurality of power source ports and load ports, each of which has a unique port number. The power source ports are intended for connecting with grid power (microgrid or distribution network) and connecting kinds of distributed generations and energy storage device to the power router. The load ports are for connecting kinds of loads to the power router. Inside the power router, the router ports are connected with the first AC power line, second AC power line, the DC power line, switch array, and control unit respectively. The bidirectional AC/DC converter is connected to the DC power line, second AC power line, power line measuring module and control unit respectively for AC-DC power conversion between the second AC power line and DC power line. The switch array is connected to the router ports, first AC power line, second AC power line, and control unit respectively. The switch array includes a single throw switch for grid connection and a plurality of double throw switches, all of which are under control of the control unit. The single throw switch can be used to connect the two AC power lines for gird connection. The double throw switches can be controlled to shift between the two AC power lines in order that power supply to the loads can be achieved by different AC power lines and, power supply to different AC power lines can be achieved by general AC power sources. The power line measuring module is connected to the DC power line, second AC power line, bidirectional AC/DC converter and control unit respectively for measuring in real time the voltage and current of the DC power line and the voltage, current, frequency and phase of the second AC power line, and simultaneously transfers above information to the bidirectional AC/DC converter and control unit. The control unit is connected to the communication module, power line measuring module, bidirectional AC/DC converter, switch array, and router ports respectively.

Figure 2:
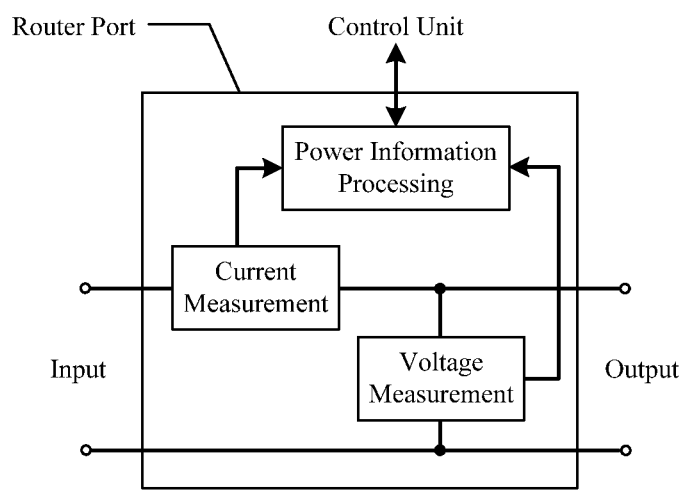
FIG. 2 shows hardware schematic of ports of the electric power router with multiple power supply modes.

Referring to FIG. 2, each router port includes a current measurement unit, a voltage measurement unit and a power information processing unit. The major part of the power information processing unit is a power measurement circuit (including chips and peripheral circuitry). The current measurement unit is connected with the port in series, while the voltage measurement unit is connected with the same port in parallel. The outputs of the current measurement unit and voltage measurement unit are connected to the input of the power information processing unit, while the output of the power information processing unit is connected to the control unit. The current measurement unit is used for measuring the current through the power source port or load port connected thereto, and the voltage measurement unit is used for measuring voltage across the power source port or load port connected thereto. The measurements from the current measurement unit and the voltage measurement unit are sent to the power information processing unit. Based on the received measurements, the power information processing unit at the power source port calculates the power quality and power supply information of the power source connected thereto and the input power flow through the port per unit time, and then sends above information in real time to the control unit; based on the measurements from the voltage measurement unit and current measurement unit, the power information processing unit at the load port calculates the electrical characteristics and power consumption of the load connected thereto and the output power flow through the port per unit time, and then sends above information in real time to the control unit.

Figure 3:
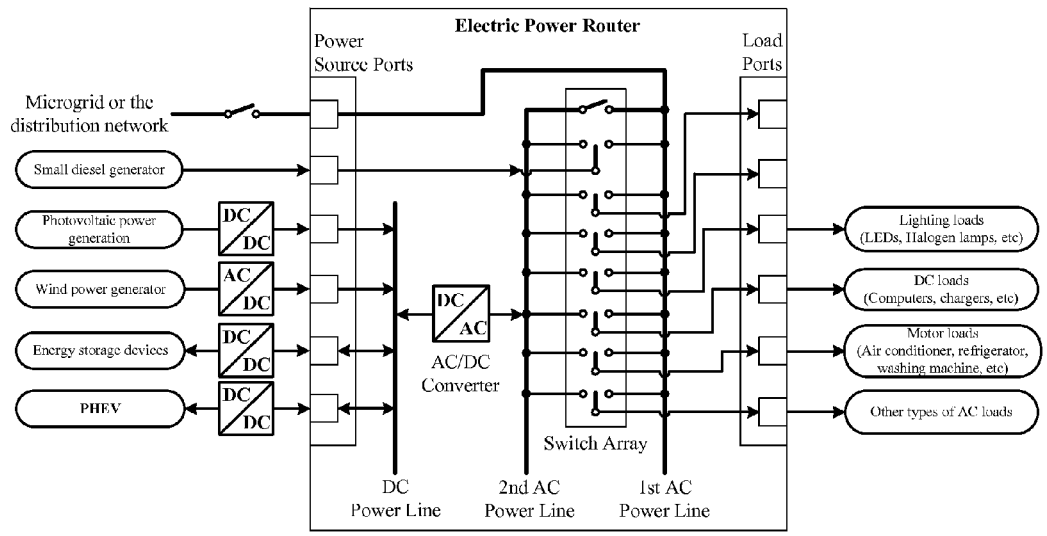
FIG. 3 illustrates a typical implementation of the electric power router with multiple power supply modes.

Referring to FIG. 3, the power source ports of the router ports include a plurality of AC power source ports and DC power source ports. The AC power source ports include a grid power dedicated port and general purpose power source ports. The grid power dedicated port is used for connecting with the grid power (distribution network or microgrid), whereas the general purpose power source ports are used for AC power sources other than the grid power. The DC power source ports are intended for connecting with kinds of DC power sources and energy storage devices. The AC power source ports may be of single phase or three phase for connecting with single-phase or three-phase grid power and AC power sources other than the grid power. The load ports may be of single phase or three phase for connecting with single-phase or three-phase loads. The switch array includes a single throw switch and a plurality of double throw switches all being controlled by the control unit. The AC/DC converter, which serves as the power electronics device to connect the DC power line and the second AC power line, is used for alternate-direct current power transfer between the two power lines. The control unit is connected respectively with the bidirectional AC/DC converter, switch array, router ports, measuring module, and communication module, for globally monitoring the operation of the above modules as well as the software and hardware system of the power router as a whole.

The specific connection among the router ports, switch array, bidirectional AC/DC converter, DC power line, and two AC power lines are described as follows: the DC power source ports are connected to the DC power line; the DC power line is connected to the second AC power line through the bidirectional AC/DC converter; the grid power dedicated port is connected to the first AC power line, the general purpose AC power source ports may be connected to the first AC power line via the double throw switches of the switch array for realizing grid tied power supply, and they may also be connected to the second AC power line via the double throw switches of the switch array for supplying power to the loads connected to the second AC power line; the second AC power line may be connected with the first AC power line by the single throw switch of the switch array for supplying power in a grid tied mode; the load ports may be connected to the first AC power line through the double throw switches of the switch array and accordingly grid power is supplied to the loads; optionally, they may also be connected to the second AC power line through the double throw switches such that power (DGs or energy storage element) other than the grid power is supplied to the loads. The double throw switches of the switch array may be embodied as single-pole double-throw relays or power electronics switches and the like. The single throw switch may be embodied as smart circuit breaker or solid-state relay and the like. The operating status (connection or disconnection, shifting from normally open terminal to normally close terminal) of these components are controlled by the control unit.

The power line measuring module is connected with the DC power line, second AC power line, bidirectional AC/DC converter, and control unit respectively, and is used for measuring instant information of voltage and current of the DC power line, and voltage, current, frequency and phase of the second AC power line, and sending above information to the AC/DC converter, and control unit in real time. The information of which is for monitoring operation status of the DC power line and second AC power line, and for controlling operation of the bidirectional AC/DC converter.

The control unit has the functions of: 1) communicating with the power sources and loads connected to the electric power router, other electric power routers, and the management system of the microgrid or the distribution network through the communication module; 2) based on the power supply information provided by each power source and the electrical characteristics and power consumption demand provided by the loads, or based on the power supplying status of the power sources and the power consumption characteristics of the loads acquired by the measurement modules of the router ports, making match the power supplying capability of the power source with the electrical characteristics and power consumption demand of the load; 3) enabling connection between the second AC power line and first AC power line by controlling the operation of the single throw switch for grid connection of the switch array, thus realizing grid tied power supply; 4) enabling connection between the load ports and either of the two AC power lines by controlling the operation of the double throw switches of the switch array, so as to supply power to the loads by either power line (grid power or other power sources except grid power); 5) enabling connection between the general purpose AC power source ports and either of two AC power lines by controlling the operation of the double throw switches of the switch array, so as to supply power to the second AC power line by AC power sources other than grid power or realize grid tied power supply; 6) calculating the total amount of power supplied by the power sources and total amount of power consumption of the loads during the process of power supply from the power sources to the loads through the electric power router; and 7) controlling operation of the bidirectional AC/DC converter according to the voltage and current of the DC power line and voltage, current, frequency and phase of the second AC power line measured by the measuring unit.

Figure 4:
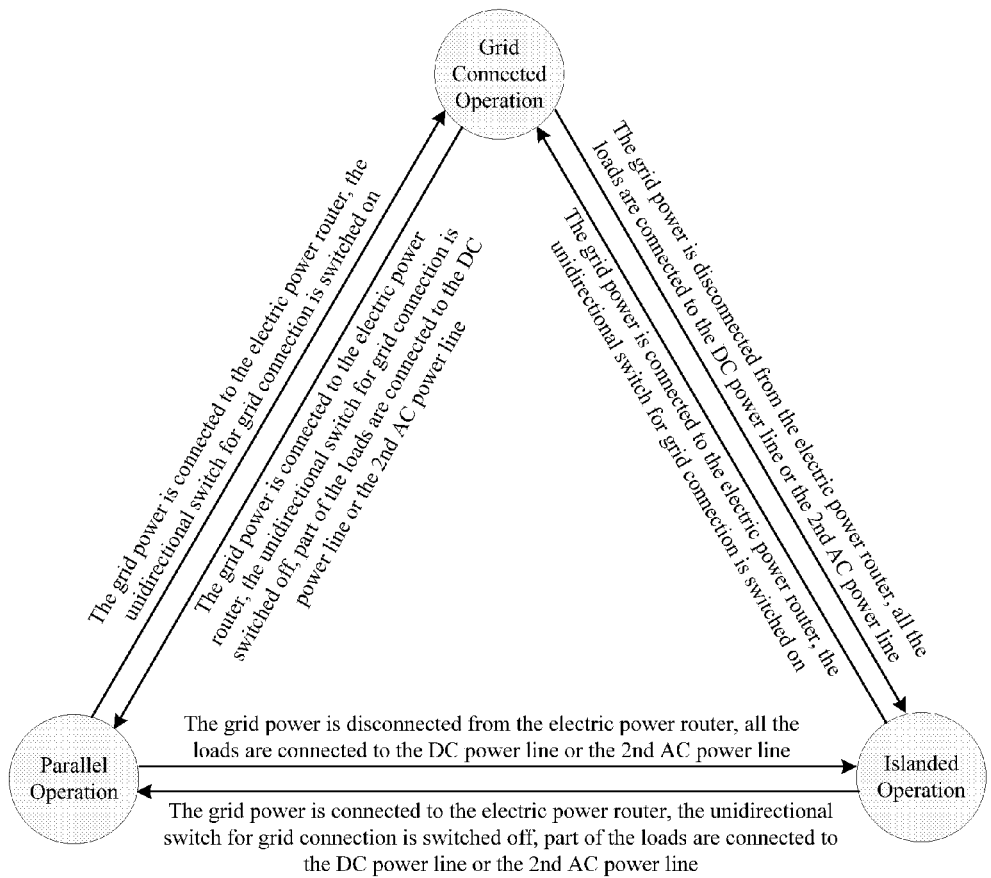
FIG. 4 illustrates the state transition diagram of three operation modes of the electric power router with multiple power supply modes.

Referring to FIG. 4, the power sources other than grid power connected to the electric power router with multiple power supply modes of the present invention may have three operation statuses: grid tied operation, islanded operation, and parallel operation. While transferring among the above three operation modes, connection, disconnection and shifting of each switch of the switch array is controlled by the control unit.

1) Grid Tied Operation

In case all the loads connected to the electric power router with multiple power supply modes are powered by the DC power line and second AC power line, and the power supply from the power sources other than the grid power is surplus, the second AC power line may be connected with the first AC power line through the single throw switch for grid connection so that the electric power router is working in grid tied operation mode.

2) Islanded Operation

When grid power is cut off, all the loads are connected to the DC power line, or to the second AC power line via the double throw switches of the switch array, all the loads connected to the electric power router are powered by the power sources other than the grid power or the energy storage element connected with the power router, which is the islanded operation mode.

3) Parallel Operation

When the grid power is connected to the electric power router and the single throw switch for grid connection is switched off, the second AC power line is disconnected with the first AC power line, but both AC power lines may supply power respectively to the loads via the double throw switches of the switch array, in this case, the energy storage element and the power sources other than the grid power, along with the gird power itself, supply power to different loads simultaneously through the electric power router.

The management of the power supply of grid power and other types of power sources, operation of kinds of energy elements and power consumption of kinds of loads by the control unit is described below:

1) Enable the use of distributed renewable energy in higher preference. Based on power supply information of power sources other than grid power and working characteristics and power consumption demand of the loads, match the power supplying capability of the power with the working characteristics and power consumption demand of the load.

2) When the power supplying capacity of the power sources other than the grid power is insufficient, the energy storage element may be used as auxiliary power source to supply power to the loads. When the power supply of the power sources other than grid power and energy storage element connected to the power router is insufficient or unable to match with the power consumption of certain loads, some of loads may be required to connect to the first AC power line via said switch array. That is, power is supplied by the grid. In this situation, energy storage element and power sources other than the grid power, as well as the grid itself, supply power to different loads through the power router simultaneously. That is, it is in parallel operation mode.

3) During peak demand in grid power usage, the energy storage element may be used as auxiliary power source to supply power to the load. When the power capacity of the power sources other than grid power is surplus, the energy storage element may be charged through the DC power line.

The invention claimed is:

1. An electric power router with multiple power supply modes includes a control unit, a communication module, a bidirectional alternate/direct current converter, a switch array, a direct current power line, two alternate current power lines, a power line measuring module, and router ports; wherein, the router ports include a plurality of power source ports and load ports, each of which has a unique port number, the power source ports include direct current ports and alternate current ports, the alternate current ports include a grid power dedicated port and general purpose ports for connections to alternate current power sources other than the grid;

the switch array includes a single throw switch for grid connection and a plurality of double throw switches, all of which are controlled by the control unit;

the direct current power source ports in the router ports are connected to the direct current power line, the direct current power line is connected to the second alternate current power line through the bidirectional alternate/direct current converter; the alternate current power source ports and load ports are connected through two alternate current power lines and the switch array; the specific connection method is as follows: the grid power dedicated port is connected with the first alternate current power line, while the general purpose alternate current power source ports are connected with the first or second alternate current power line via the double throw switches of the switch array;

the load ports are connected with the first or second alternate current power line via the double throw switches of the switch array; the second alternate current power line is connected with the first alternate current power line by the single throw switch for grid connection of the switch array; by shifting of the double throw switches of the switch array, each of the load ports is connected with either of two alternate current power lines; by shifting of the double throw switches of the switch array, each of the general purpose alternate current power source ports is connected with either of two alternate current power lines;

each router port includes a current measurement unit, a voltage measurement unit and a power information processing unit; the current measurement unit is connected with the router port in series, while the voltage measurement unit is connected with the router port in parallel; the outputs of the current measurement unit and voltage measurement unit are connected to the input of the power information processing unit, while the output of the power information processing unit is connected to the control unit;

the current measurement unit is used for measuring the current through the power source port or load port connected thereto, and the voltage measurement unit is used for measuring the voltage across the power source port or load port connected thereto; the measurements from the current measurement unit and the voltage measurement unit are sent to the power information processing unit, the power information processing unit at the power source port calculates the power quality and power supply information of the power source connected thereto and the input power flow through the router port per unit time, and then sends above information in real time to the control unit; the power information processing unit at the load port calculates the electrical characteristics and power consumption of the load connected thereto and the output power flow through the router port per unit time, and then sends above information in real time to the control unit;

the alternate current power source ports are of single phase or three phase in electricity for connections with single-phase or three-phase grid power and alternate current power sources other than the grid power; the load ports are of single phase or three phase in electricity for connections with single-phase or three-phase loads;

the power line measuring module is used for measuring instant information such as voltage and current of the direct current power line, and voltage, current, frequency and phase of the second alternate current power line, and sending above information to the alternate/direct current converter and control unit in real time;

the control unit is connected respectively with the bidirectional AC/DC converter, switch array, router ports, power line measuring module and communication module; the operation of the control unit includes: 1) communicating with the power sources and loads connected to the electric power router, other electric power routers, and the management system of the microgrid or the distribution network through the communication module; 2) based on the power supply information provided by each power source and the electrical characteristics and power consumption demand provided by the loads, or based on power supplying status of the power sources and the power consumption characteristics of the loads acquired by the measurement module of the router ports, matching the power supplying capability of the power sources with the electrical characteristics and power consumption demand of the loads; 3) achieving connection between the second alternate current power line and first alternate current power line by controlling the operation of the single throw switch for grid connection of the switch array; 4) achieving connection between the load ports and either of two alternate current power lines by controlling the operation of the double throw switches of the switch array; 5) achieving connection between the general purpose alternate current power source ports and either of two alternate current power lines by controlling the operation of the double throw switches of the switch array; 6) calculating the total amount of power supplied by the power sources and total amount of power consumption of the loads during the process of power supply from the power sources to the loads through the electric power router; and 7) controlling the operation of the bidirectional alternate/direct current converter according to the voltage and current of the direct current power line and voltage, current, frequency and phase of the second alternate current power line measured by the power line measuring module.

2. The electric power router according to claim 1, wherein, the power sources other than the grid power connected to the electric power router with multiple power supply modes have three operation modes: the grid tied operation, islanded operation, and parallel operation; 1) in case all the loads connected to the electric power router are powered by the direct current power line and second alternate current power line, and the power supply from the power sources other than the grid power is surplus, the second alternate current power line is connected with the first alternate current power line through the single throw switch for grid connection so that the electric power router is working in grid tied operation mode; 2) when grid power is cut off, all the loads are connected to the direct current power line or to the second alternate current power line via the double throw switches of the switch array, all the loads connected to the electric power router are powered by the power sources other than the grid power or the energy storage element connected with the power router, which is the islanded operation; 3) when the grid power is connected to the electric power router and the single throw switch for grid connection is switched off, the second alternate current power line is disconnected with the first alternate current power line, but both alternate current power lines supply power to the loads via the double throw switches of the switch array, in this case, the energy storage element and the power sources other than the grid power, along with the grid power itself, supply power to different loads simultaneously through the electric power router, which is the parallel operation mode; during above processes, operations including connection, disconnection and shifting of any one of the switches of the switch array are controlled by the control unit.

* * * * *